(12) United States Patent
Utsuzawa et al.

(10) Patent No.: US 10,301,924 B2
(45) Date of Patent: May 28, 2019

(54) CORRECTION OF MOTION EFFECT IN NUCLEAR MAGNETIC RESONANCE (NMR) LOGGING

(71) Applicant: Schlumberger Technology Corporation, Sugar Land, TX (US)

(72) Inventors: Shin Utsuzawa, Missouri City, TX (US); Martin Hurlimann, Newton, MA (US); Lukasz Zielinski, Cambridge (GB); Haitao Zhang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 460 days.

(21) Appl. No.: 14/914,193

(22) PCT Filed: Aug. 21, 2014

(86) PCT No.: PCT/US2014/052029
§ 371 (c)(1),
(2) Date: Feb. 24, 2016

(87) PCT Pub. No.: WO2015/031149
PCT Pub. Date: Mar. 5, 2015

(65) Prior Publication Data
US 2016/0202384 A1    Jul. 14, 2016

Related U.S. Application Data

(60) Provisional application No. 61/869,735, filed on Aug. 25, 2013.

(51) Int. Cl.
*G01V 3/00* (2006.01)
*E21B 47/024* (2006.01)
(Continued)

(52) U.S. Cl.
CPC ............ *E21B 47/024* (2013.01); *E21B 17/10* (2013.01); *E21B 47/00* (2013.01); *G01V 3/14* (2013.01);
(Continued)

(58) Field of Classification Search
CPC ....... G03G 2215/0119; G03G 15/0131; G03G 15/161; G03G 15/1615; G03G 15/0194
See application file for complete search history.

(56) References Cited

U.S. PATENT DOCUMENTS 6,566,874 B1   5/2003   Speier et al.
6,597,171 B2   7/2003   Hurlimann et al.
(Continued)

FOREIGN PATENT DOCUMENTS

WO    2015031149 A1    3/2015

OTHER PUBLICATIONS

International Search Report and the Written Opinion for International Application No. PCT/US2014/052029 dated Dec. 2, 2014.
(Continued)

*Primary Examiner* — Water L Lindsay, Jr.
*Assistant Examiner* — Frederick Wenderoth

(57) ABSTRACT

A method for correcting motion-effects from a downhole measurement includes, in one embodiment, determining relative motion of a downhole logging tool for a given logging operation in a borehole formed in an earth formation, determining a motion induced signal decay (MID) based upon the determined relative motion, determining a motion-effect inversion kernel (MEK) based upon the determined MID, using the downhole logging tool to acquire measurements that are affected by motion of the downhole logging tool during the logging operation, and using the MEK to process the acquired motion-affected measurements
(Continued)

to obtain motion-corrected data. Corresponding systems, devices, and apparatuses are also disclosed herein.

28 Claims, 11 Drawing Sheets

(51) Int. Cl.
  *E21B 47/00* (2012.01)
  *G01V 3/32* (2006.01)
  *E21B 17/10* (2006.01)
  *G01V 3/14* (2006.01)
  *G01V 3/18* (2006.01)
  *G01V 3/38* (2006.01)

(52) U.S. Cl.
  CPC .............. *G01V 3/18* (2013.01); *G01V 3/32* (2013.01); *G01V 3/38* (2013.01)

(56) References Cited

U.S. PATENT DOCUMENTS

| | | | |
|---|---|---|---|
| 6,975,112 | B2 | 12/2005 | Morys et al. |
| 7,180,287 | B2 | 2/2007 | Rottengatter et al. |
| 7,268,547 | B2 | 9/2007 | Kruspe et al. |
| 7,358,725 | B2 | 4/2008 | Blanz |
| 2003/0132749 | A1 | 7/2003 | Speier et al. |
| 2004/0000905 | A1* | 1/2004 | Freedman ............ G01N 24/081 324/303 |
| 2005/0088176 | A1* | 4/2005 | Kruspe ................ G01N 24/081 324/303 |
| 2007/0222443 | A1 | 9/2007 | Blanz |
| 2008/0009701 | A1 | 1/2008 | Avram et al. |
| 2014/0122037 | A1* | 5/2014 | Prange ................ G01V 99/005 703/2 |
| 2015/0241541 | A1* | 8/2015 | Blanz ............... G01R 33/56509 324/303 |

OTHER PUBLICATIONS

Carr et al. "Effects of Diffusion on Free Precession in Nuclear Magnetic Resonance Experiments," Physical Review, vol. 94, No. 3, pp. 630-638, 1954.

Hahn, et al. "Detection of Sea-Water Motion by Nuclear Precession", 1960, Journal of Geophysical Research, vol. 65, No. 2, pp. 776-777.

Benson, et al., "Profile Amplitude Modulation in Stray-Field Magnetic-Resonance Imaging", 1995, Journal of Magnetic Resonance, Series A, vol. 112, pp. 17-23.

Ahola, et al. "Multiecho sequence for velocity imaging in inhomogeneous rf fields", 2006, Journal of Magnetic Resonance, vol. 182, pp. 143-151.

\* cited by examiner

CORRECTION OF MOTION EFFECT IN NUCLEAR MAGNETIC RESONANCE (NMR) LOGGING

CROSS REFERENCE TO RELATED APPLICATIONS

This application claims priority, as a Patent Cooperation Treaty patent application of the United States, to Provisional patent application Ser. No. 61/869,735 filed Aug. 25, 2013 with the same title.

BACKGROUND

Technical Field

The present disclosure relates generally to nuclear magnetic resonance (NMR) logging and, more specifically, to techniques for correction of motion effects in NMR logging.

Background Information

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Logging tools have long been used in wellbores to make, for example, formation evaluation measurements to infer properties of the formations surrounding the borehole and the fluids in the formations. Common logging tools include electromagnetic tools, nuclear tools, acoustic tools, and nuclear magnetic resonance (NMR) tools, though various other types of tools for evaluating formation properties are also available.

Early logging tools were run into a wellbore on a wireline cable after the wellbore had been drilled. Modern versions of such wireline tools are still used extensively. However, as the demand for information while drilling a borehole continued to increase, measurement-while-drilling (MWD) tools and logging-while-drilling (LWD) tools have since been developed. MWD tools typically provide drilling parameter information such as weight on the bit, torque, temperature, pressure, direction, and inclination. LWD tools typically provide formation evaluation measurements such as resistivity, porosity, NMR distributions, and so forth. MWD and LWD tools often have characteristics common to wireline tools (e.g., transmitting and receiving antennas, sensors, etc.), but MWD and LWD tools are designed and constructed to endure and operate in the harsh environment of drilling.

In LWD operations, the drilling process can induce a complex lateral motion whose amplitude and frequency spectrum can depend on a number of parameters. For instance, the motion can have random and periodic components depending on various parameters, such as weight-on-bit (WOB), RPM, stabilizer size, torque-on-bit (TOB), and/or inclination, to name just a few example. Further, the motion may also differ based on the drilling path orientation/direction, i.e., vertical drilling and horizontal drilling may yield different induced motion behavior.

NMR tools using in well logging typically measure, among other things, relaxation times, such as transverse relaxation times ($T_2$), of formation fluids, which can range from a fraction of a millisecond to several seconds. With respect to NMR logging tools, typically, an excitation slice is determined by an excitation bandwidth and a received slice is determined by a receiver bandwidth. A sensitive region may be determined based upon the smaller of excitation bandwidth (usually depends on available RF power) and receiver bandwidth. Essentially, the sensitive region is the overlap between the excited slice and the received slice, usually having the shape of a concentric shell. If an NMR logging tool moves by a sizeable fraction of the excited slice (typically having a thickness on the order of 1 centimeter) during tool operation, the resulting measurements can have reduced accuracy. As an example, the influence of tool motion can appear as an additional signal decay that makes an apparent $T_2$ appear shorter than its intrinsic value (e.g., expected value if no induced motion were present). This can result in an under-estimation of permeability, which is used to evaluate formation productivity. Accordingly, addressing the effects of tool measurements that can be caused by the above-described types of induced lateral motion during LWD drilling applications is a challenge for the industry. It would be desirable to have a technique for removing or otherwise compensating for such motion effects.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth in this section.

In accordance with one example embodiment, a method includes determining relative motion of a downhole logging tool for a given logging operation in a borehole formed in an earth formation, determining a motion induced signal decay (MID) based upon the determined relative motion, determining a motion-effect inversion kernel (MEK) based upon the determined MID, using the downhole logging tool to acquire measurements that are affected by motion of the downhole logging tool during the logging operation, and using the MEK to process the acquired motion-affected measurements to obtain motion-corrected data.

In accordance with another example embodiment, a system includes a downhole logging tool that, when deployed in a borehole, acquires measurements of a formation surrounding the borehole, the acquired measurements being affected due to lateral motion of the downhole logging tool during acquisition of the measurements. The system further includes a processing device that performs an inversion on the motion-affected measurements to obtain motion-corrected data representative one or more properties of the formation using a motion-effect kernel (MEK), wherein the MEK is derived based on a motion induced signal decay (MID) determined based on a known relative motion of the downhole logging tool.

Again, the brief summary presented above is intended to familiarize the reader with certain aspects and contexts of embodiments of the present disclosure without limitation to the claimed subject matter.

BRIEF DESCRIPTION OF DRAWINGS

The present disclosure is best understood from the following detailed description when read with the accompanying figures. It is emphasized that, in accordance with standard practice in the industry, various features are not necessarily drawn to scale. In fact, the dimensions of various features may be arbitrarily increased or recued for clarify of discussion.

DETAILED DESCRIPTION

One or more specific embodiments of the present disclosure are described below. These embodiments are merely examples of the presently disclosed techniques. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

Figure 1:
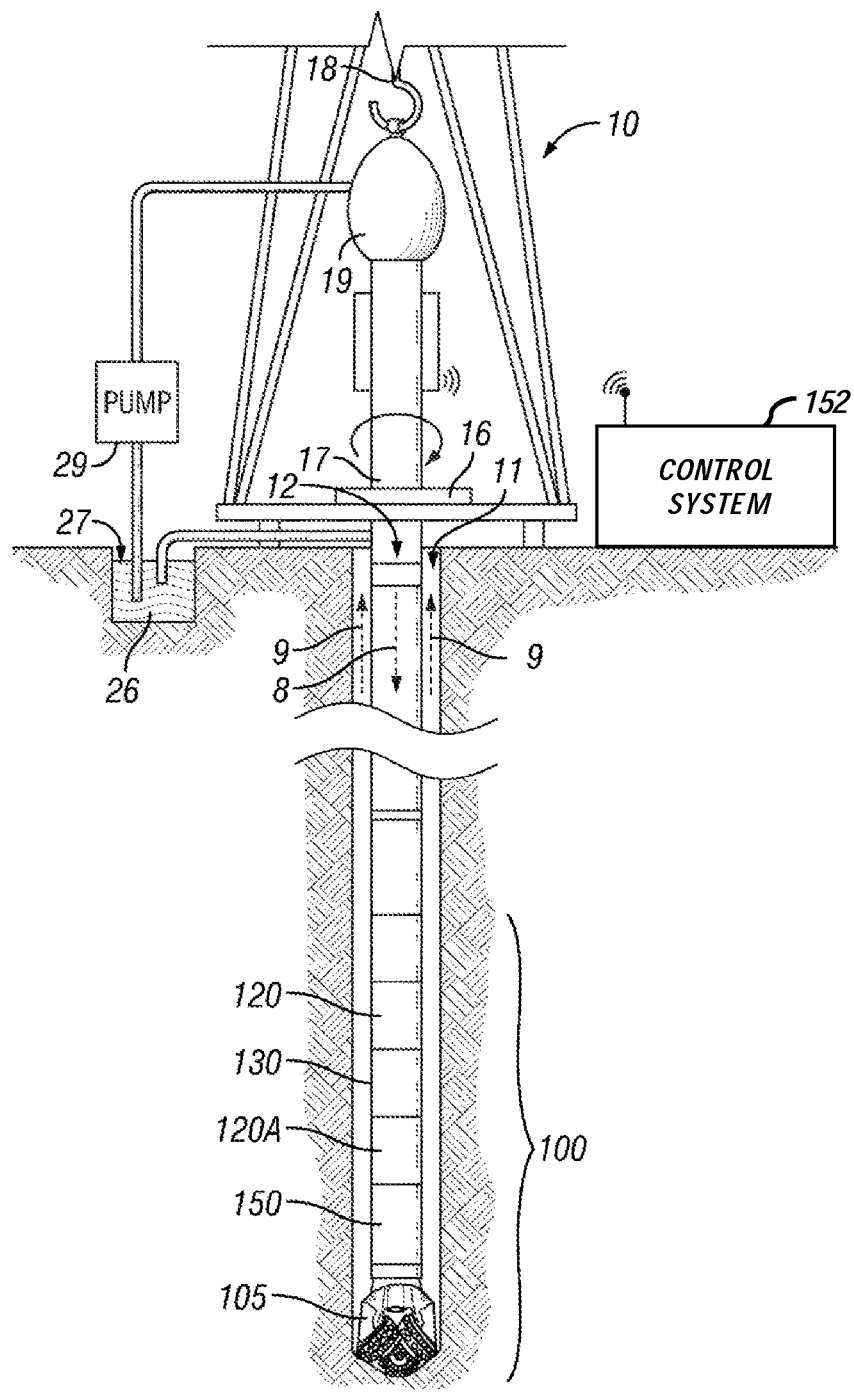
FIG. 1 is a schematic diagram of a wellsite system that may be used for implementation of an example embodiment.

FIG. 1 represents a simplified view of a well site system in which various embodiments can be employed. The well site system depicted in FIG. 1 can be deployed in either onshore or offshore applications. In this type of system, a borehole 11 is formed in subsurface formations by rotary drilling in a manner that is well known to those skilled in the art. Some embodiments can also use directional drilling.

A drill string 12 is suspended within the borehole 11 and has a bottom hole assembly (BHA) 100 which includes a drill bit 105 at its lower end. The surface system includes a platform and derrick assembly 10 positioned over the borehole 11, with the assembly 10 including a rotary table 16, kelly 17, hook 18 and rotary swivel 19. In a drilling operation, the drill string 12 is rotated by the rotary table 16 (energized by means not shown), which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. As is well known, a top drive system could be used in other embodiments.

Drilling fluid or mud 26 may be stored in a pit 27 formed at the well site. A pump 29 delivers the drilling fluid 26 to the interior of the drill string 12 via a port in the swivel 19, which causes the drilling fluid 26 to flow downwardly through the drill string 12, as indicated by the directional arrow 8 in FIG. 1. The drilling fluid exits the drill string 12 via ports in the drill bit 105, and then circulates upwardly through the annulus region between the outside of the drill string 12 and the wall of the borehole, as indicated by the directional arrows 9. In this known manner, the drilling fluid lubricates the drill bit 105 and carries formation cuttings up to the surface as it is returned to the pit 27 for recirculation.

The drill string 12 includes a BHA 100. In the illustrated embodiment, the BHA 100 is shown as having one MWD module 130 and multiple LWD modules 120 (with reference number 120A depicting a second LWD module 120). As used herein, the term "module" as applied to MWD and LWD devices is understood to mean either a single tool or a suite of multiple tools contained in a single modular device. Additionally, the BHA 100 includes a rotary steerable system (RSS) and motor 150 and a drill bit 105.

The LWD modules 120 may be housed in a drill collar and can include one or more types of logging tools. The LWD modules 120 may include capabilities for measuring, processing, and storing information, as well as for communicating with the surface equipment. By way of example, the LWD module 120 may include a nuclear magnetic resonance (NMR) logging tool, and may include capabilities for measuring, processing, and storing information, and for communicating with surface equipment.

The MWD module 130 is also housed in a drill collar, and can contain one or more devices for measuring characteristics of the drill string and drill bit. In the present embodiment, the MWD module 130 can include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package). The MWD tool 130 further includes an apparatus (not shown) for generating electrical power for the downhole system. For instance, power generated by the MWD tool 130 may be used to power the MWD tool 130 and the LWD tool(s) 120.

In some embodiments, this apparatus may include a mud turbine generator powered by the flow of the drilling fluid 26. It is understood, however, that other power and/or battery systems may be employed.

The operation of the assembly 10 of FIG. 1 may be controlled using control system 152 located at the surface. The control system 152 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and so forth.

Before discussing the motion correction techniques set forth in this disclosure, some background with respect to the operation of NMR logging tools is first provided. NMR well logging tools are typically used to measure the properties of nuclear spins in the formation, such as the longitudinal (or spin-lattice) relaxation time (usually referred to as $T_1$), transverse (or spin-spin) relaxation time (usually referred to as $T_2$), and diffusion coefficient (D). Knowledge of these NMR properties can help aid in determination of basic formation properties such as permeability and porosity, as well as the fluid properties such as fluid type and viscosity.

By way of background, NMR logging tools, i.e., LWD tool 120 of FIG. 1, may use permanent magnets to create a strong static magnetic polarizing field inside the formation. The hydrogen nuclei of water and hydrocarbons are electrically charged spinning protons that create a weak magnetic field, similar to tiny bar magnets. When a strong external magnetic field from the logging tool passes through a formation containing fluids, these spinning protons align themselves like compass needles along the magnetic field. This process, called polarization, increases exponentially with $T_1$ (longitudinal relaxation time), while the external magnetic field (usually referred to as the $B_0$ field) is applied.

Figure 2:
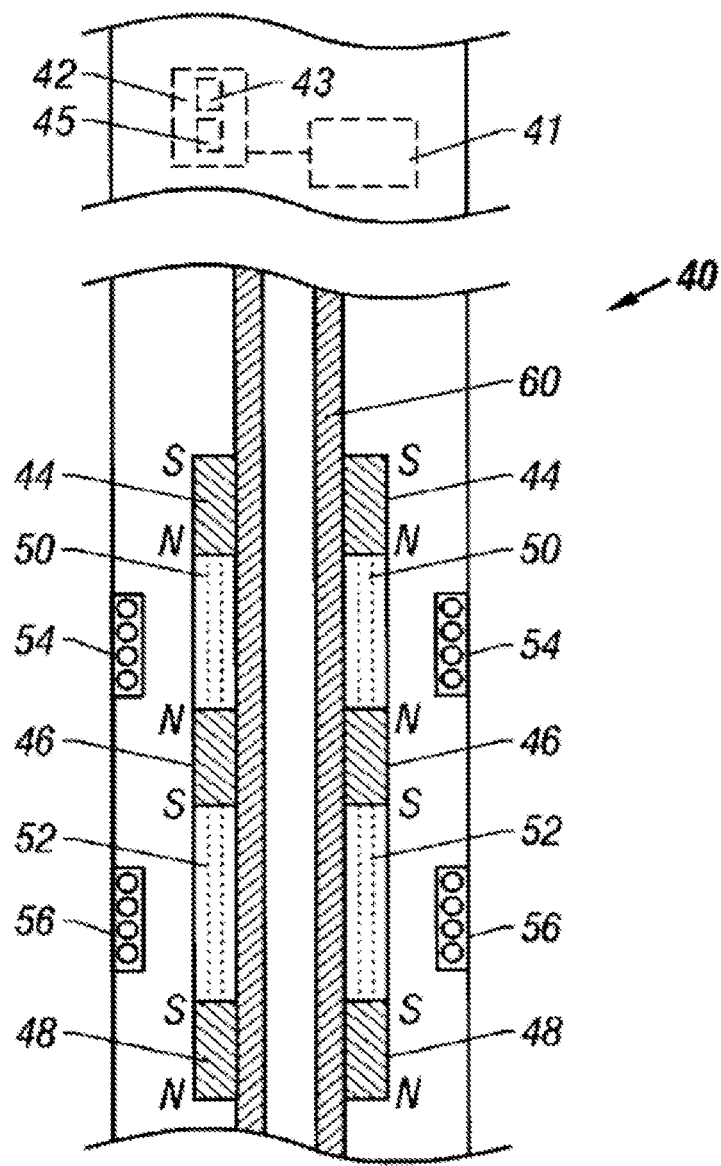
FIG. 2 is an example embodiment of a nuclear magnetic resonance (NMR) logging tool that may be used in the wellsite system of FIG. 1.

FIG. 2 shows an example of an NMR logging tool 40 that is described in commonly assigned U.S. Pat. No. 6,566,874, which is hereby incorporated by reference. As an example, the illustrated device in FIG. 2 may be used as the LWD tool 120 or part of an LWD tool suite 120A. The NMR tool 40 may be constructed to conduct two different measurements in two different locations using two different gradients. For instance, sensitivity to motion may be varied by varying the size of the resonance region by measuring in different field geometries (i.e., a saddle point geometry and gradient geometry, as an example of two different geometries) or by performing measurements with different gradients. In this manner, the NMR tool 40 may include upper 44, middle 46 and lower 48 permanent magnets that circumscribe an inner protective sleeve 60 of the NMR tool 40. The upper 44 and middle 46 magnets produce a radial, axisymmetric static $B_0$ field, and the middle 46 and lower 48 magnets produce another radial, axisymmetric static $B_0$ field. Because, as an example, the upper 44 and middle 46 magnets are closer together than the middle 46 and lower 48 magnets, the upper $B_0$ field has a higher gradient (and thus, is more sensitive to motion) than the lower $B_0$ field.

Among the other features of the illustrated NMR tool 40 are that the tool 40 may include a radio frequency (RF) coil 54 which acts as an antenna to transmit $B_1$ pulses and receive spin echo signals for the upper $B_0$ field and an RF coil 56 to transmit $B_1$ pulses and receive spin echo signals for the lower $B_0$ field. The coils 54 and 56 may be coupled to electronic circuitry 42 (of the NMR tool 40) that includes, among other things, $B_1$ pulse generators 43 and a memory 45 to store indications of the received spin echoes before transmitting indications of the spin echoes uphole. The electronic circuitry 42 may be coupled to a motion device 41 (i.e., an accelerometer, strain gauge, ultrasonic finder and/or a magnetometer, as just a few examples) that indicates motion of the NMR tool. This indication may be further processed by the electronic circuitry 42 before being transmitted uphole in some embodiments.

In operation, measurements are obtained by applying a second oscillating magnetic field (usually referred to as the $B_1$ field) as a series of pulses from an antenna (e.g., coil 54 in FIG. 2) of the NMR tool, which can be followed by or interleaved with data acquisition. These pulses may be based on the Carr-Purcell-Meiboom-Gill (CPMG) pulse sequence or its variants, in which trains of spin echoes are generated by a series of pulses. The pulses cause the aligned protons to tip into a plane perpendicular (transverse) to the direction of the polarization field ($B_0$). These tipped protons will start to precess around the direction of the strong logging-tool magnetic field at a frequency called the Larmor frequency.

The precessing protons create an oscillating magnetic field, which generates weak radio signals at this frequency. The total signal amplitude from the precessing hydrogen nuclei (e.g., a few microvolts) is a measure of the total hydrogen content, or porosity, of the formation. The rate at which the precession decays is the transverse relaxation time ($T_2$), which is indicative of the rate at which the spinning protons lose their alignment within the transverse plane. It can depend on certain factors, such as: the intrinsic bulk-relaxation rate in the fluid; the surface-relaxation rate, which is an environmental effect; and relaxation from diffusion in a polarized field gradient, which is a combination of environmental and tool effects.

Additionally, diffusion coefficients (D) can also be measured by applying a set of pulses with variable durations in between to encode the diffusive attenuation in spin echo amplitudes. Further, NMR measurement types can be combined to obtain information regarding the formation and/or the fluids present therein. For instance, $T_2$ and D measurements can be combined to obtain two-dimensional information on formation fluids. In another example, $T_2$ and $T_1$ measurements can be combined as well. In general, any NMR measurements including but not limited to the above examples may be combined to obtain multi-dimensional information on the formation or formation fluids.

Once the desired NMR data is acquired, mathematical inversion processes can be applied to produce the distribution of measured properties that reflects the anisotropy of formation or formation fluids. For example, the $T_2$ distribution represents the distribution of pore sizes within the formation, and the area under $T_2$ curve represents the porosity filled with formation fluids. Interpretation of pore size distribution and logarithmic mean $T_2$ may be used for calculating various petrophysical parameters, such as permeability and the amount of free/bound fluid.

One commonly used inversion scheme for NMR well logging tools is based on a non-negative least squares method to derive the distribution of one or more measured properties. The method includes the formulation of a forward model, commonly referred to as a kernel or kernel function. For example, when using a CPMG pulse sequence, the amplitude of the k-th echo (ignoring polarization and diffusion effects) can be given as:

$$\overline{m_k} = \sum_{j=1}^{NT_2} a_j e^{-\frac{k \cdot t_e}{T_{2j}}} \quad (1)$$

where $NT_2$ represents the number of components in the $T_2$ distribution, $a_j$ and $T_{2j}$ represent the amplitude and relaxation time, respectively, of component j, and $t_e$ represents the echo spacing. The overbar over the magnetization symbol m indicates it is reconstructed.

The kernel function K can be an $NE \times NT_2$ matrix, whose elements in the simplest case can be expressed as:

$$K_{kj} = e^{-\frac{k \cdot t_e}{T_{2j}}} \quad (2)$$

In Equation (2), the kernel function $K_{kj}$ shows the response of the k-th echo at a decay rate of $T_{2j}$. Each row in the matrix corresponds to an echo and includes information on how it responds to decay rates. When the NMR data contains other sources of signal decay in addition to those attributable to $T_2$ relaxation, such as $T_1$ relaxation or diffusion (D), the above-mentioned kernel may be extended to accommodate such additional decays. These additional decays may be analytically formulated based on tool design and pulse sequence used.

Referring above to Equation (1), when written in matrix form, Equation (1) can be rewritten as:

$$m = K \cdot a \quad (3)$$

The inversion process typically minimizes an objective function $\varepsilon^2$, such as:

$$\varepsilon^2 = \sum_{k=1}^{NE} (\overline{m_k} - m_k)^2 \quad (4)$$
$$= (m - K \cdot a)^T \cdot (m - K \cdot a)$$

where NE is the number of echoes in the CPMG echo train and the superscript T means transpose (e.g., interchanging the rows and columns of the matrix). The resulting solution, a, which is a matrix of $T_2$ components (a $T_2$ distribution), can be given by:

$$a = (K^T \cdot K)^{-1} \cdot K^T \cdot m \quad (5)$$

As will be appreciated, in some inversions of this type, a non-negativity constraint can be applied to the components of a. In addition, regularization and compression can also be applied.

Figure 3A:
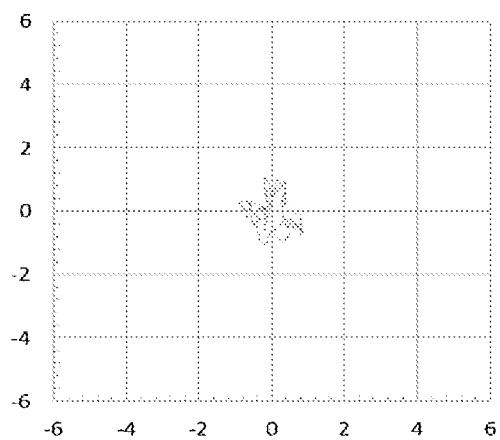
FIGS. 3A-3C are graphs that depict various types of lateral tool motion that may be experienced by an NMR logging tool during operation in a borehole.
Figure 3B:
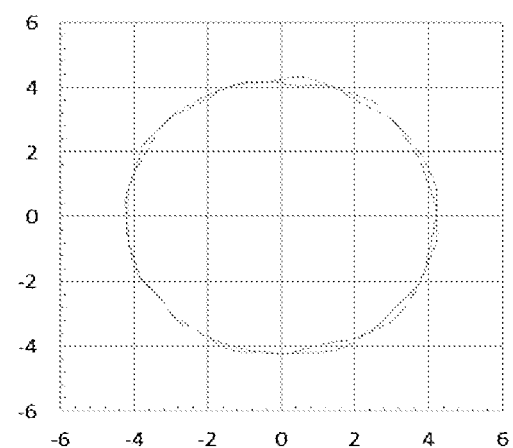
Figure 3C:
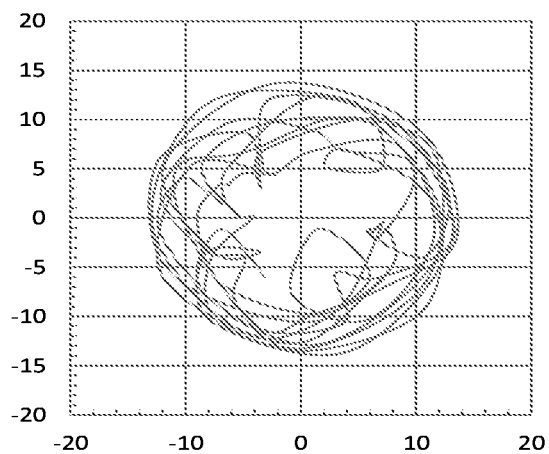

As discussed above, one of the challenges with formation evaluation using LWD operations is due to complex lateral motion that is induced during the drilling process. For example, such motion effects may have amplitude and frequency spectrums that depend on a number of parameters. For instance, the motion can have random and periodic components depending on various parameters, such as weight-on-bit (WOB), rotations per minute (RPM) (or per other unit of time, e.g., seconds), stabilizer size, torque-on-bit (TOB), and/or wellbore inclination, to name just a few example. Further, the motion behavior may also differ depending on whether the drilling is occurring in a vertical or horizontal section of a borehole. As an example, FIGS. 3A to 3C show several examples of lateral tool motion that may negatively affect NMR measurements. FIG. 3A depicts random motion with a relatively small amplitude. FIG. 3B depicts a smooth forward whirl motion with a medium amplitude. FIG. 3C depicts a rougher backward whirl motion with an even larger amplitude, which is a situation that may occur when a large WOB is applied in drilling vertically.

As described above, NMR measurements are typically made by applying two magnetic fields, namely a static field ($B_0$) and an oscillating field ($B_1$) to a specimen to measure nuclear spin properties, the distributions of these magnetic fields may be determined by tool geometry. Accordingly, if there is a net relative displacement (other than diffusion) between the tool and the specimen in inhomogeneous magnetic fields, the nuclear spins in the specimen experience time-varying magnetic fields. These magnetic field variations can cause signal attenuation, referred to herein as "motion-induced decay" (MID) which can be generally classified into two categories: (1) displacement-dependent signal loss and (2) velocity-dependent signal loss.

With respect to displacement dependent signal loss, this is due a limited sample volume observed by an NMR logging tool. Measurement times for NMR logging are usually determined by the measured property and a desired resolution. For example, intrinsic $T_2$ may range from a fraction of a millisecond to several seconds. To have sufficient resolution to detect a particular relaxation time, the measurement will usually have the duration of the order of that targeted time. Therefore, where the above-described lateral tool motion occurs over a millisecond to several seconds, the measurement of the corresponding $T_2$ component can be affected. With respect to $T_2$ distributions, the resulting effect from the signal decay caused by such lateral tool motion is that the long $T_2$ components are "squeezed" into the shorter $T_2$ side while maintaining the area under curve (i.e., the porosity) constant. This can result in an underestimation of certain formation parameters, such as permeability.

Figure 4:
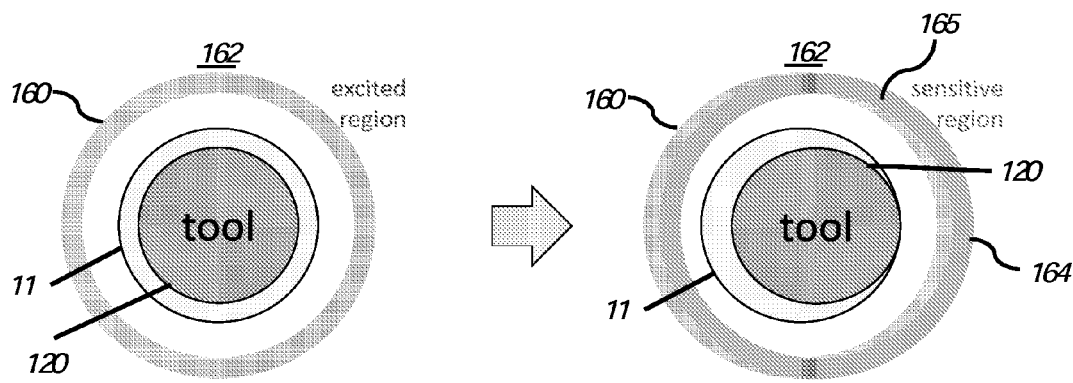
FIG. 4 is a simplified example showing how lateral displacement of an NMR tool within a borehole during operation can affect NMR measurements.

A simplified example of this occurrence is shown in FIG. 4, where an LWD NMR tool 120 operates while in the borehole 11 formed in a formation 162. The left side of FIG. 4 shows a region (a concentric shell) with in the formation 162 that is excited by the tool 120 is depicted at 160. If during a time period that is on the order of a targeted time (e.g., a millisecond to several seconds), the tool 120 moves laterally in the borehole 11 to the position shown on the right side of FIG. 4, it can be seen that the detection region 164 (received slice) of the tool 120 does not overlap fully with the excited region 160. This can negatively affect the accuracy of the $T_2$ measurement. The sensitive region 165 is the overlap between the excited region 160 and receiver region 164. The effect of the tool motion may appear as an additional signal decay that makes the apparent $T_2$ shorter than the intrinsic value. As used herein "apparent" or the like refers to the actual measurements obtained, and "intrinsic" or the like refers to the measurements expected if the lateral tool motion were absent.

If we consider a constant $B_0$ gradient, g, and a constant $B_1$ over the sample volume, the excitation slice thickness may be expressed as:

$$\Delta r = \frac{2B_1}{g} \quad (6)$$

where Δr corresponds to the shell thickness of the excited region 160 for a tool where the magnetic fields are axisymmetric and the resulting sample volume is quasi-cylindrical shell(s). In some tools, the sample volumes may have different shapes, such as slabs, or other more complex shapes. When the displacement is larger than a fraction of Δr, signal decay will occur according to the amount of overlap between the sensitive region 164 and excited region 160. As an example and with reference to FIG. 7A, where displacement is a relatively small fraction of Δr, such as 0.1Δr, at a low velocity (e.g., v=0.1$v_{ph}$) a corresponding signal decay may be relatively small, i.e., approximately 5% at a displacement of 0.1Δr. As the fraction of Δr increases, such as to 0.5Δr, and assuming the same velocity, the signal decay also increases, i.e., to approximately 30%. Generally speaking, a smaller overlap between these regions can result in greater the signal loss. Additionally, in some embodiments, the bandwidth of the NMR tool receiver (e.g., a receiving antenna) can also affect the signal loss. For example, if the receiver bandwidth is less than the excitation bandwidth (e.g., if region 164 is narrower than region 160 in FIG. 4), signal loss may be less pronounced for the given displacement.

Velocity-dependent signal loss differs from displacement-dependent signal loss in that it is due to the phase shift acquired by spins moving in a magnetic field gradient. This phase shift may correspond to the rotation of the effective rotation axis around z-axis. It is analogous to applying pulses with particular phases, which would deviate from the optimal phases for the particular pulse sequence used. For example, the CPMG pulse sequence yields a series of spin echoes by inverting the phase of the spins with successive refocusing pulses, so that they repeatedly pass through the points of the maximum coherence. Thus, behavior of observed NMR signals depends on the phase of the excitation and refocusing pulses applied. For example, consider a spin that is moving at a constant velocity v in a magnetic field with a linear gradient g. γ represents the gyromagnetic ratio of a nucleus of interest (e.g., $^1$H). If perfect RF pulses are assumed, an extra phase shift (in radians), ϕ, acquired at the time of the first echo t=$t_E$ can be written as:

$$\phi = \frac{\gamma g v t_E^2}{4} \quad (7)$$

If one assumes that the magnetization after the initial 90°$_x$ pulse lies exactly on the y-axis, then a 180°$_y$ pulse may behave like a pulse around an axis that is shifted from the y-axis by ϕ/2. Magnetization parallel to the effective rotation axis behaves as in the CPMG sequence and preserve the amplitude from echo to echo, while the component perpendicular to the effective rotation axis behaves as in the unmodified Carr-Purcell sequence and lead to the odd-even echo oscillations with the overall signal decay, especially when there are any pulse imperfections.

The above discussion is generally applicable to any system where there is net relative displacement of spins with respect to the $B_0$ field, for example, when spins are stationary and the tool is moving, or vice versa. More importantly, the signal loss is in fact caused by the variation of the offset frequency $\Delta\omega_0 = \omega_0 - \omega_{rf}$, where $\omega_0(r) = \gamma B_0(r)$ is the Larmor frequency determined by the local $B_0$ field at point r and the gyromagnetic ratio γ of the nucleus (e.g., γ=2π×42.6 MHz/T for proton: $^1$H), and $\omega_{rf}$ is the tool's operating frequency at which the signal transmission/reception takes place. Therefore, it is possible to observe the same phenomena by creating a situation, with each spin experiencing the variation of $\Delta\omega_0$. By way of example, the above-referenced U.S. Pat. No. 6,566,874 discloses a method to mimic the effect of relative motion without physically moving a tool or a sample. To observe odd-even echo oscillations, the '874 patent discloses changing the tool operating frequency ($\omega_{rf}$) during NMR measurements.

The amount of the signal loss depends on the two regimes mentioned above, as well as various parameters, but the observed signal for the given motion-induced decay (MID) can be described in a general form:

$$\langle \text{observed decay} \rangle = \langle \text{intrinsic decay} \rangle \cdot \langle \text{MID} \rangle \quad (8)$$

For example, when MID is defined as the sum of multiple exponentials, the amplitude of k-th echo may be defined as in accordance with Equation (1):

$$\overline{m_k} = \sum_{j=1}^{NT_2} a_j e^{-\frac{k \cdot t_e}{T_{2j}}} \sum_{l=1}^{NT_{2m}} a_l e^{-\frac{k \cdot t_e}{T_{2ml}}} \quad (9)$$

where $NT_{2m}$ is the number of components in the MID, and $a_l$ and $T_{2ml}$ are the amplitude and relaxation time of the component l in the MID, respectively. It is noted that the realization of MID is not limited to being exponential, but can take any form depending on the nature of the tool motion and the tool properties.

Having described the types of tool motion that may be encountered in LWD operations, embodiments of the present disclosure provide techniques for correcting motion-affected NMR data obtained in during well logging. While the technique is particularly beneficial to LWD applications where lateral tool motion is generally a more prevalent issue, such techniques could also be applied in wireline or slickline applications, i.e., correcting for motion experienced by a logging sonde used to log a borehole by slickline or wireline. In accordance with aspects of the disclosure, techniques for correcting motion-affected NMR data may include compensating for signal decay introduced by a net relative displacement between a sample (e.g., an excited region in a formation) and a measuring apparatus (an LWD NMR tool 120) by applying a correction factor to an inversion kernel. The correction factor, in some embodiments, may be derived based on motion-induced decay estimated by NMR spin dynamics simulation or a net relative displacement (as a unit of excitation slice thickness (Δr), i.e. an "effective displacement"), both being based on the relative motion that is measured, modeled, or otherwise predicted/determined. The details of such techniques are described in further detail below.

Figure 5:
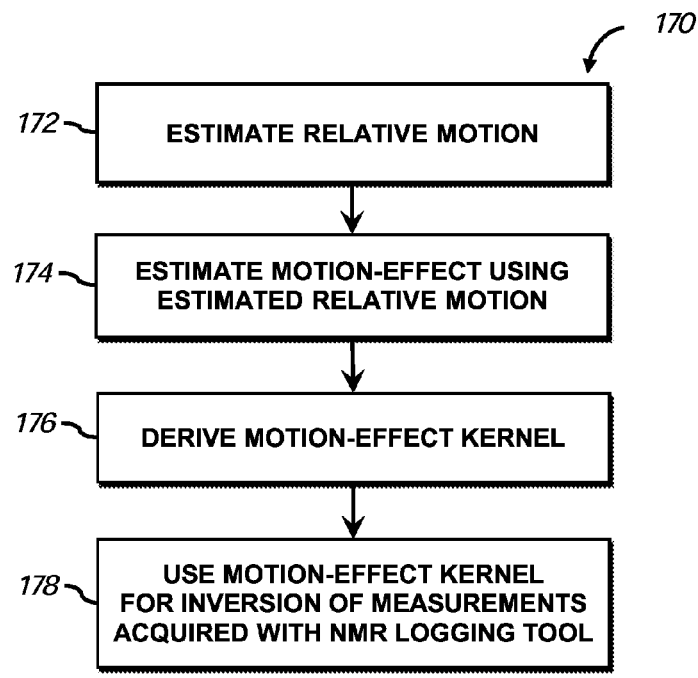
FIG. 5 is an example embodiment of a method for obtaining motion-corrected NMR data using a motion-effect kernel.

A method 170 for correcting motion-affected NMR data is depicted in FIG. 5 in accordance with an example embodiment. The method 170 includes estimating relative motion at 172 for an NMR logging tool. From the estimated relative motion, a motion-effect can be estimated at 174. Using the motion-effect, an inversion kernel can be derived at 176. The motion-effect kernel can then be used for inverting NMR measurements acquired using the NMR logging tool at 178.

In accordance with embodiments of this disclosure, the estimation of relative motion (172) can be determined using sensors located on the tool, by modeling the transient dynamic behavior of the BHA (e.g., BHA 100 of FIG. 1), or using a combination of such techniques. For instance, sensors that may be employed for measuring tool motion may include one or a combination of an accelerometer, magnetometer, gyroscope, caliper, or standoff measurements. In some embodiments, such motion sensing/measurement devices may be located proximate to the NMR sensor (e.g., the magnet and/or antenna of an NMR tool), although in other embodiments, such motion sensing/measurement devices may be located further away from the NMR sensor (e.g., on a separate tool of the BHA, such as in an MWD tool 130). It will be understood that generally as the motion sensing device is placed further from the NMR sensor, the resulting data may not accurately reflect tool motion at the location for NMR sensor, which may cause the resulting motion-induced decay to be over-estimated or under-estimated.

With respect to BHA modeling, finite element analysis of the BHA may be used. Modeling techniques may be employed to predict the transient dynamic behavior of a BHA, such as by calculating the interactions between the BHA and rock surfaces (i.e., accelerations of the drill string collars when they impact the wellbore wall) for given drilling parameters and formation properties. The output of such modeling is the tool position at a given time step, from which velocity, acceleration, and overall displacement may be derived. As can be appreciated, BHA modeling can be used to complement downhole motion measurements, or as an alternative if no downhole motion measurement devices are available or such devices are located far from the NMR sensor. In some embodiments, BHA modeling may also be done using analytical solutions (e.g., without finite element analysis). It will be appreciated that motion correction based on measured, modeled, and/or predicted motion, in accordance with the embodiments described herein, are applicable not only to LWD NMR applications, but for any NMR applications where there is a net relative displacement between a specimen and a measurement device. Further, other types of modeling techniques may be also be used to determine net relative displacement in various NMR applications, and may be depend on the physics that governs such relative motion. As examples, fluid dynamics modeling, particle dynamics modeling, and/or net transport modeling may be used in some NMR applications that encounter net relative displacement. Further, these types of modeling techniques may, in some embodiments, be used instead or in conjunction with BHA modeling for LWD NMR applications.

Once motion data is obtained (from 172), either as a predicted specific trajectory or as parameters representing the motion (e.g., overall amplitude and velocity) MID can be derived. In one embodiment, MID can be derived using NMR spin-dynamics solution, which can calculate the evolution of spins in given magnetic fields at given time steps. Thus, by moving the magnetic fields with respect to the nuclear spins, a spin dynamics simulation can reproduce the effect of relative motion on NMR measurements, where the amount of field shift at a given time is obtained from the output of the previous step of estimating the relative motion of the tool (e.g., 172 in FIG. 4). As can be appreciated, this behavior is typically unique to each tool/formation, and thus would typically be determined per tool, per run.

Figure 6:
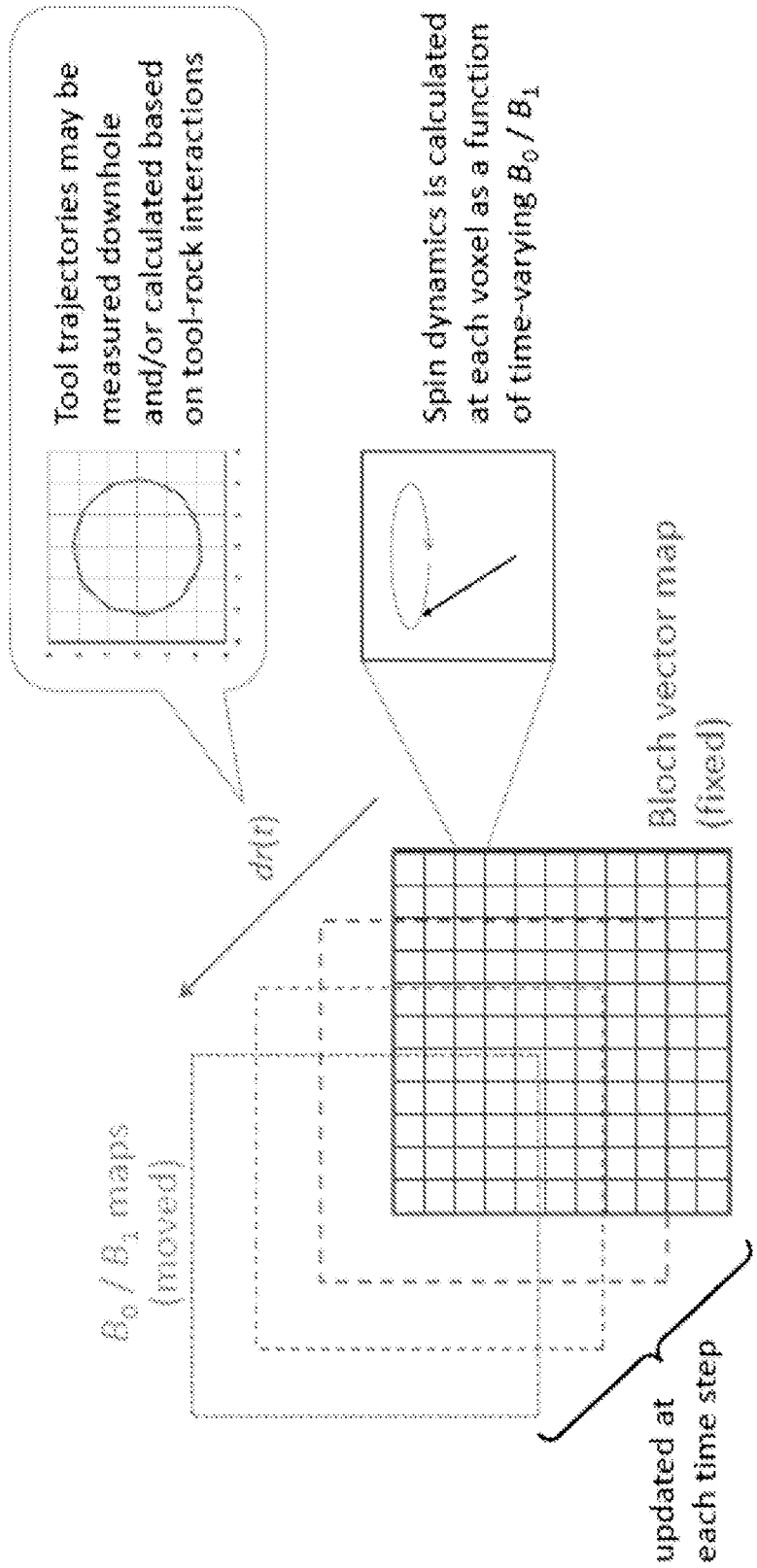
FIG. 6 shows an example embodiment of a technique for estimating motion-induced signal decay using spin dynamics simulation.

FIG. 6 depicts generally a spin dynamics simulation technique in accordance with an embodiment, in which spin dynamics are calculated at each voxel of a Bloch vector map for spins at each time step as a function of a time-varying $B_0$ field and/or $B_1$ field (e.g., B0 maps, B1 maps, or both B0 and B1 maps may be used). The $B_0$ and/or $B_1$ maps are updated at each time step based on the estimated tool trajectory (e.g., from 172), and the corresponding voxels in the B0 and/or B1 maps are used to calculate spin rotation at each voxel of the spin maps. The maps may have different values at each grid, which corresponds to the inhomogeneity of the fields ($B_0$ and/or $B_1$).

In another embodiment, MID can be derived from net relative displacement by considering special cases. For instance, in accordance with Equation (7), to avoid appreciable phase shifts in NMR signals:

$$\frac{\gamma g v t_E^2}{4} << \frac{\pi}{2} \tag{10}$$

which can be written as:

$$v_{ph} << \frac{2\pi}{\gamma g t_E^2} \tag{11}$$

When above condition is satisfied, i.e., when motion is slow compared to the echo spacing $t_E$ (i.e., fast pulsing regime), then the on-resonance spins adiabatically track the effective rotation axis to gradually get off-resonance. This process is determined by the amplitude of motion and irrespective of the speed of motion. Here, $v_{ph}$ represents the speed at which signal loss can occur.

Figure 7A:
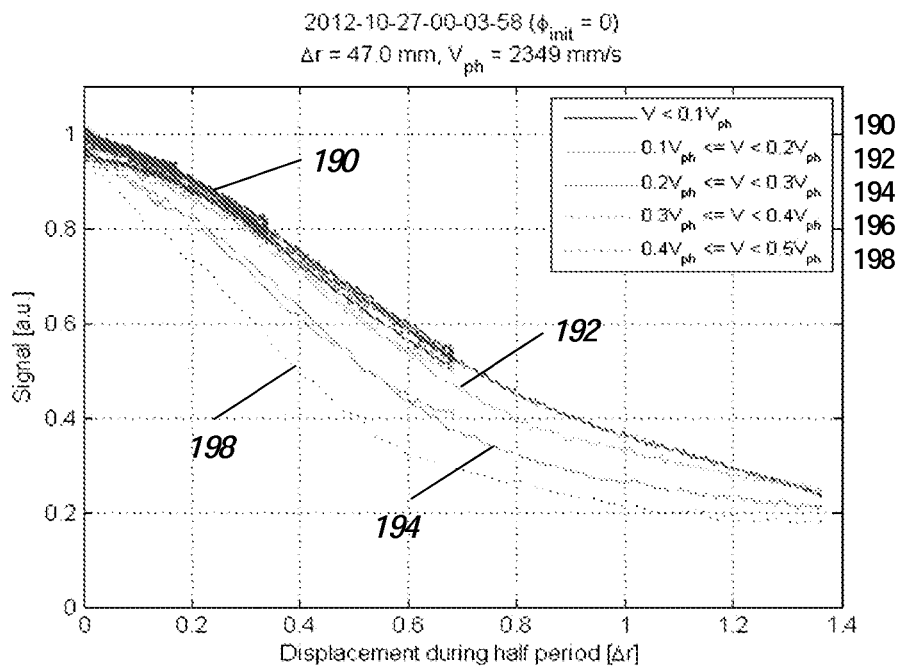
FIGS. 7A and 7B are graphs showing signal decay induced by linear and circular motion, respectively, of a logging tool at various amplitudes and frequencies.
Figure 7B:
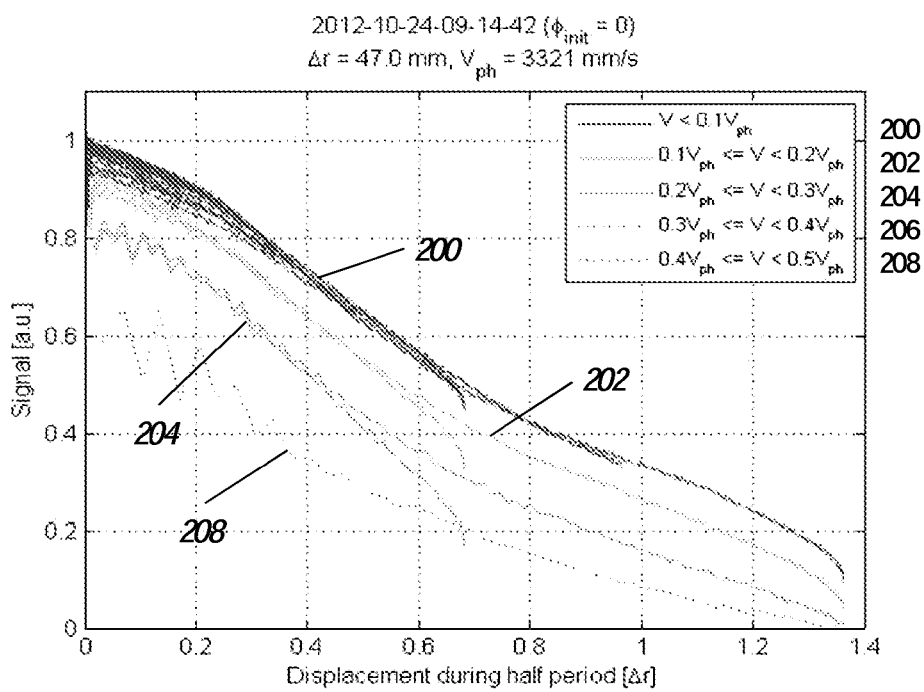

The relationship between displacement and signal loss can be generalized by using the effective displacement in the unit of the slice thickness $\Delta r = 2B_1/g$. FIGS. 7A and 7B show example signal decays for linear (FIG. 7A) and circular (FIG. 7B) trajectories as a function of the effective displacement with various amplitudes and frequencies in a 1 G/cm magnetic field gradient. The horizontal axes in FIGS. 7A and 7B represents the effective displacement in the unit of the slice thickness $\Delta r = 2B_1/g$. As can be seen, there are clear influences of both the motion velocity and displacement on observed signal decay. However, when velocity is much smaller than $v_{ph}$, the decay curves fall generally onto the same line regardless of the realization of that velocity (i.e., combination of amplitude and frequency). Further when velocity is sufficiently small (<$0.1v_{ph}$, curve 190 in FIG. 7A and curve 200 in FIG. 7B), linear and circular motions possess nearly identical decay rate as a function of the effective displacement up to approximately ~$\Delta r$ (the slice thickness of an excited region/shell).

This allows for estimation of the amount of signal decay based on the effective displacement (or other parameters correlated with the effective displacement) without being dependent on knowing the exact trajectories of relative motion. Therefore, although the BHA modeling provides motion data that is not necessarily timely correlated with NMR measurement, it is still viable as a source of MID estimation.

It is noted that the observed signal decays in FIGS. 7A and 7B look similar to a Gaussian function, i.e., slow signal decay at the beginning followed by more rapid decays. This is because (1) the profile of the excitation slice is not a box function but rather gradually decaying towards both ends of the slice and (2) LWD NMR tools typically have axisymmetric magnetic fields and resulting pseudo-cylindrical sensitive volume, which may result in the size of the overlap region before and after the displacement is not linear to the amount of the displacement.

Figure 8:
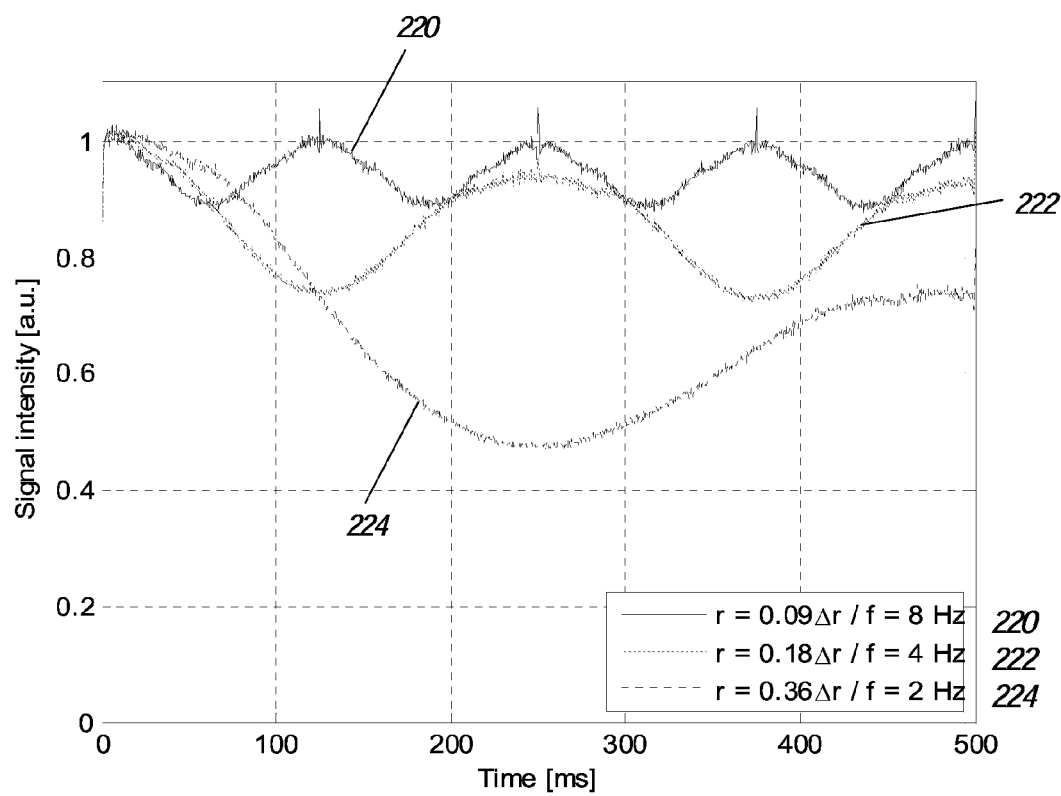
FIG. 8 shows the effect of motion amplitude and frequency on motion-induced decay, in accordance with an example embodiment.

Another property that characterizes MID is the signal recovery. In the fast pulsing regime mentioned above (e.g., when Equation (11) is satisfied), on-resonance spins adiabatically track the effective rotation axis to gradually get off-resonance. If the net displacement is sufficiently small, then a signal recovery can be seen when motion brings those spins back into resonance. This is shown in curve 220 of FIG. 8, which illustrates the effect of motion amplitude on motion-induced decay. Here, each curve 220, 222, 224 represents a motion with the same nominal velocity, but with different amplitude and frequency. The initial portions of the curves (e.g., between approximately 0-75 ms) are similar, as decay is determined by displacement. For a motion with small amplitude (curve 220), the signal recovers when the tool comes back to the original position after one period (e.g., approximately t=125 ms for 8 Hz motion—curve 220). However, once displacement becomes appreciable compared to the slice thickness, signal loss may be irreversible, as shown by curve 224.

Next, once MID is determined (from 174), a correction can be applied to an inversion kernel, which can be used to "remove" motion effects from motion-affected NMR data. In accordance with embodiments of this disclosure, a correction factor <MID> may be applied to the inversion kernel of Equation (2). The kernel, with the correction factor applied, may be rewritten as follows:

$$K'_{kj} = e^{-\frac{k \cdot t_e}{T_{2j}}} e^{-\frac{k \cdot t_e}{T_{2m}}} \quad (12)$$

where $T_{2m}$ is the time constant of the motion-induced decay that it is represented by exponential decay. Essentially, the modified motion-effect kernel (MEK) is an NMR inversion kernel that takes motion effects into account when inverting NMR measurements. In general, the MID can take any suitable form. Equation (12) may be rewritten in a general form:

$$K'_{kj} = e^{-\frac{k \cdot t_e}{T_{2j}}} f_m(k \cdot t_e) \quad (13)$$

With this MEK, the inversion process (e.g., 178 of FIG. 5) fits the observed NMR signal to <(reconstructed) intrinsic decay> times the estimated <MID>.

Essentially, <MEK> is equivalent to <MID> times the <conventional kernel> (e.g., $\exp^{\wedge}((-kt_E)/T_{2j}))$, where <MID> can take any suitable form (e.g., <MID>=f(k, $t_E$) for the k-th echo. Because both the fitting function and fitted data include the MID term, the resulting $T_2$ distribution reflects the intrinsic signal decay that is independent of MID. Although $T_2$ measurements in well logging have been described herein as an example of a measurement to which the above-described motion-effect correction techniques may be applied, those of ordinary skill in the art will recognize the disclosed methods are suitable for use in any system for which the motion can be modeled, measured, or otherwise predicted.

Figure 9:
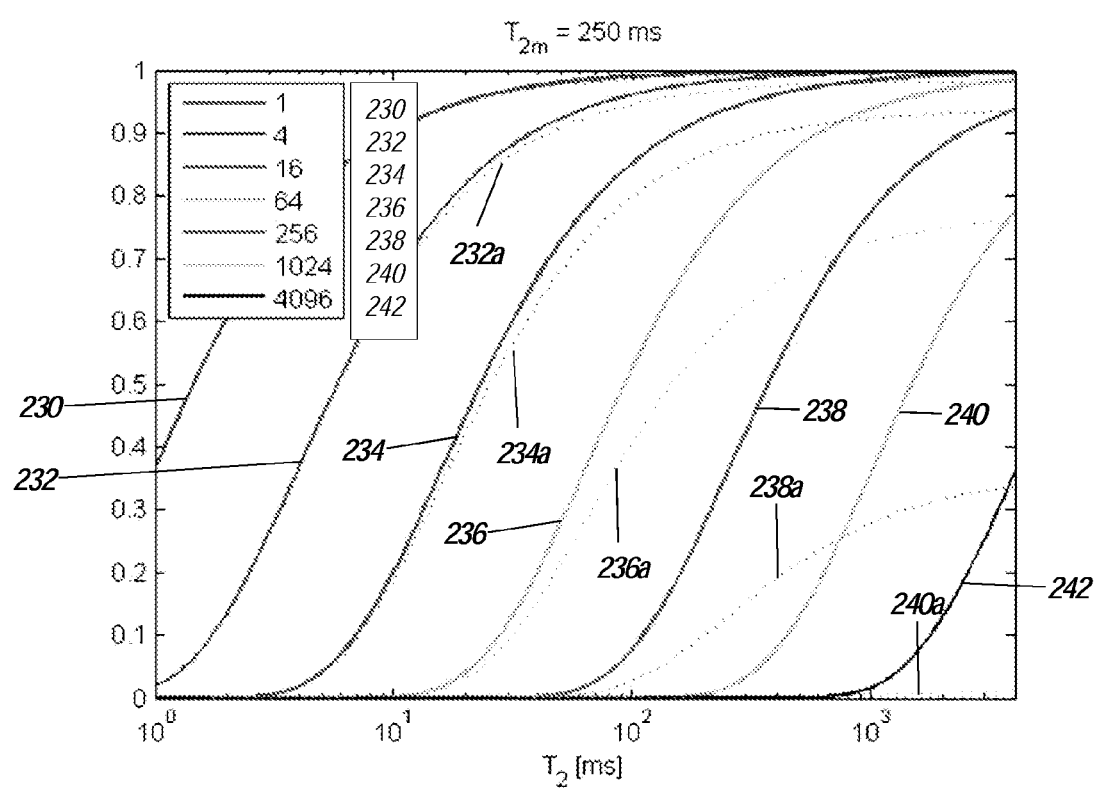
FIG. 9 illustrates a motion-effect kernel that is used for inversion of motion-affected NMR data, in accordance with an example embodiment.

FIG. 9 shows an example of the motion-effect kernel (MEK) prepared for the inversion of NMR data under a particular motion trajectory. The solid lines (230-242) represent the original sensitivity for given echo numbers, while dashed lines (230a-242a) represent the corresponding echo numbers attenuated by the MID. The MID reduces the sensitivity of later echoes when compared to the original kernel K (Equation (2)). In the present example, the MID is characterized by a single exponential with the time constant $T_{2m}$=250 ms. As can be seen with reference to curve 240, the 1024th echo (corresponding to 1024 ms) loses almost all the sensitivity (comparing curve 240 to its corresponding curve 240a). Conversely, curve 230, representing the 1st echo, loses almost no sensitivity.

Figure 10:
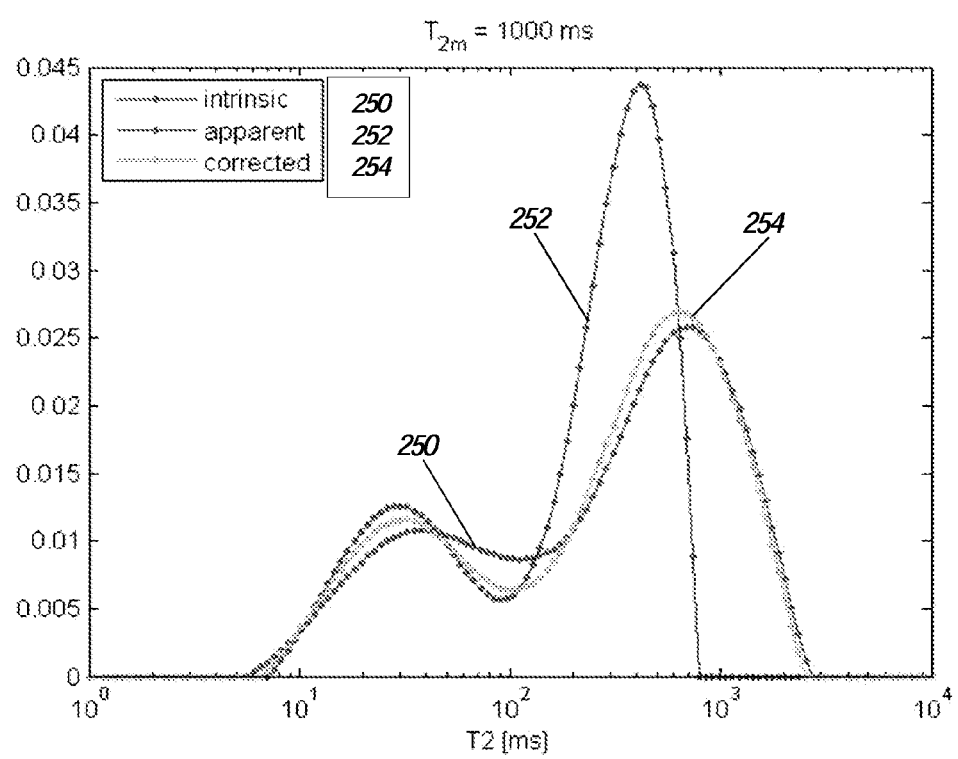
FIG. 10 shows an example of the result of inversion of motion-affected NMR using the motion-effect kernel for a tool undergoing a modest degree of motion.

FIG. 10 shows the result of an example inversion for $T_2$ using the MEK obtained as described above for a tool that undergoes modest motion. Curve 250 represents the intrinsic $T_2$ distribution, whereas curve 252 represents the apparent $T_2$ distribution. As can be seen, the MID introduced additional signal decay results in a $T_2$ distribution that is distorted at the longer $T_2$ end (e.g., the values are heavily "squeezed" between approximately 100 to 1000 ms). Curve 254 represents the corrected $T_2$ distribution obtained using the MEK which, as can be seen in FIG. 10, is much closer to the intrinsic $T_2$ distribution 250.

Figure 11:
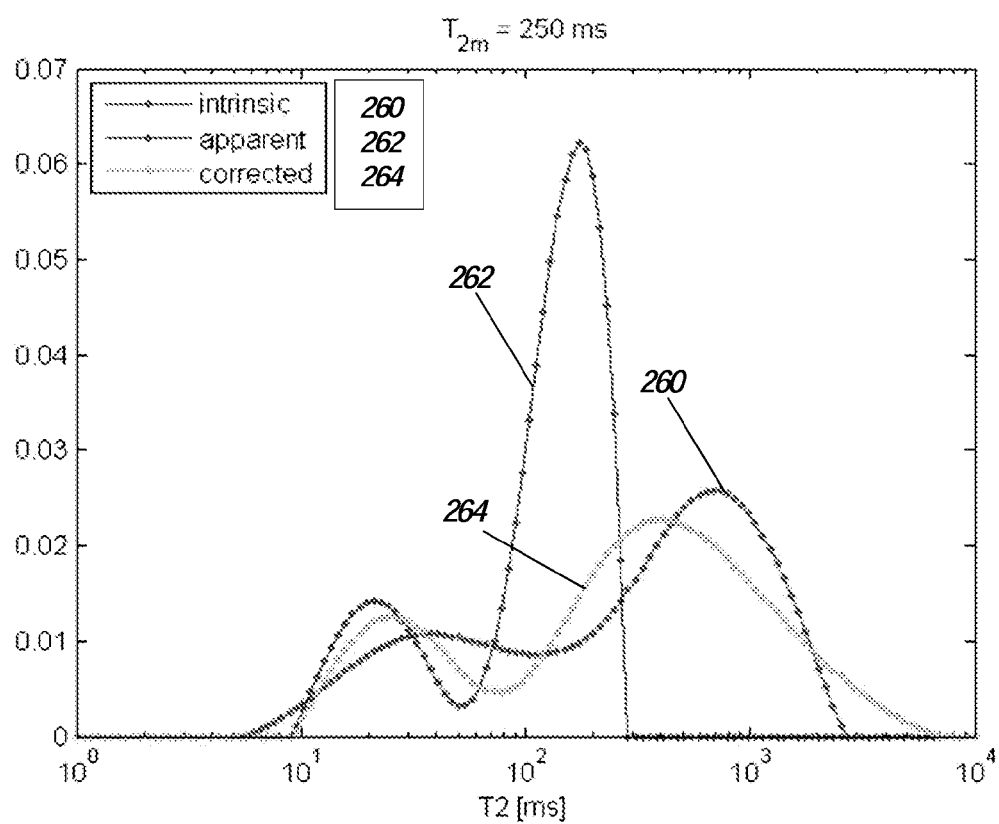
FIG. 11 shows an example of the result of inversion of motion-affected NMR using the motion-effect kernel for a tool undergoing more severe motion when compared to FIG. 10

FIG. 11 shows the result of an example inversion for $T_2$ using the MEK obtained as described above for a tool that undergoes more severe motion. Curve 260 represents the intrinsic $T_2$ distribution, whereas curve 262 represents the apparent $T_2$ distribution. Curve 264 represents the corrected $T_2$ distribution obtained using the MEK. As the MID goes to zero within the data acquisition window, the MEK loses the sensitivity for the higher echo numbers, which can distort the reconstruction. The resulting distribution curve is imperfect, but still useful for estimation of formation properties.

Figure 12:
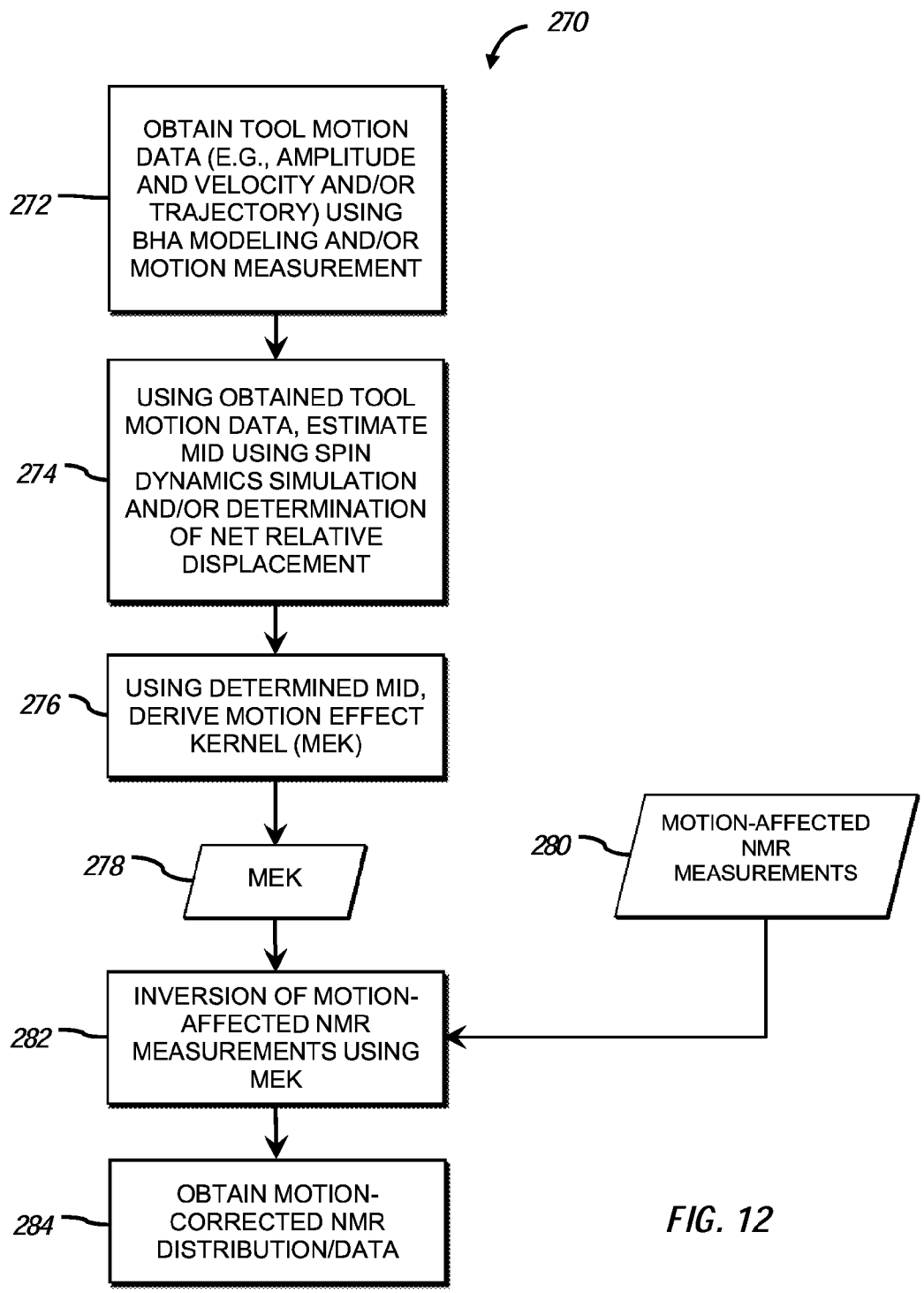
FIG. 12 is another example embodiment of a method for obtaining motion-corrected NMR data using a motion-effect kernel.

FIG. 12 depicts a method 270 that is a more detailed embodiment of the method 170 of FIG. 5. As shown, the method 270 includes obtaining tool motion data (e.g., amplitude and trajectory and/or tool trajectory) using, for example, BHA modeling and/or motion measurement data (e.g., accelerometer, gyroscope, caliper, etc.) at 272. Using the tool motion data obtained at 272, a motion-induced decay (MID) is estimated at 274 using spin dynamics simulation and/or net relative displacement. At 276, the determined MID is used to derive a motion-effect kernel (MEK) as shown at 278. Using the MEK 278, motion-affected NMR measurements 280 undergo an inversion at 282. The result of the inversion is motion-corrected NMR data (e.g., a distribution, such as $T_2$ distribution) at 284.

As will be understood, the various techniques described above and relating to the processing of NMR measurements for motion correction due to lateral tool motion are provided as example embodiments. Accordingly, it should be understood that the present disclosure should not be construed as being limited to only the examples provided above. Further, it should be appreciated that the NMR processing techniques disclosed herein may be implemented in any suitable manner, including hardware (suitably configured circuitry), software (e.g., via a computer program including executable code stored on one or more tangible computer readable medium), or via using a combination of both hardware and software elements. Further, it is understood that the various NMR motion-correction techniques described may be implemented on a downhole processor (e.g., a processor that is part of an NMR logging tool), such that the inversion using the MEK to obtain motion-corrected NMR data is performed downhole, with the results sent to the surface by any suitable telemetry technique. Additionally, in other embodiments, NMR measurements may be transmitted uphole via telemetry, and the inversion of such measurements may be performed uphole on a surface computer (e.g., part of control system 152 in FIG. 1).

Further, those of ordinary skill in the art will recognize that the motion effects mentioned above is not limited to well logging, but also arises in any NMR measurement or its variation associated with imaging (magnetic resonance imaging: MRI) where there is net displacement between a specimen for investigation and the magnetic fields applied by an NMR device to the specimen. Other applications of such techniques may include medical applications, as well as industrial setups where the given sample is transported by some sort of automated transport systems, such as belt conveyor. Another example is the measurement of flowing samples such as the liquid/granular flow in a pipe, vessel, and/or channel. Another example is the scanning of industrial, architectural, agricultural, or other products and/or natural resources by moving a tool relative to such specimens in a manner not dissimilar to well logging of a formation surrounding a borehole.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A method for logging a subterranean wellbore, the method comprising:
   (a) deploying a nuclear magnetic resonance (NMR) logging tool in a subterranean wellbore, the NMR logging tool including a plurality of permanent magnets and a plurality of radio frequency (RF) coils;
   (b) determining relative motion of the NMR logging tool during said deployment in in (a);
   (c) determining a motion induced signal decay (MID) based upon the determined relative motion;
   (d) determining a motion-effect inversion kernel (MEK) based upon the determined MID;
   (e) using the NMR logging tool to acquire NMR logging measurements, while deployed in (a), the NMR logging measurements being affected by the relative motion of the NMR logging tool; and
   (f) using the MEK to process said NMR logging the acquired motion affected measurements to obtain motion-corrected NMR logging data.

2. A system comprising:
   a downhole logging tool that, when deployed in a borehole, acquires measurements of a formation surrounding the borehole, the acquired measurements being affected due to lateral motion of the downhole logging tool during acquisition of the measurements; and
   a processing device configured to perform an inversion on the motion-affected measurements to obtain motion-corrected data representative one or more properties of the formation using a motion-effect kernel (MEK), wherein the MEK is derived based on a motion induced signal decay (MID) determined based on a known relative motion of the downhole logging tool.

3. The method of claim 1, wherein the relative motion is determined using at least one motion measurement sensor located on the NMR logging tool.

4. The method of claim 3, wherein the at least one motion measurement sensor comprises at least one of an accelerometer, a magnetometer, a gyroscope, a caliper, or any combination thereof.

5. The method of claim 3, wherein the at least one motion measurement sensor is located proximate to one of the RF coils.

6. The method of claim 1, wherein the NMR logging measurements comprise spin echoes obtain in response to a pulse sequence applied to a excited region of the earth formation.

7. The method of claim 1, wherein the motion-corrected NMR logging data comprises a motion corrected T1 distribution or a motion-corrected T2 distribution.

8. The method of claim 1, wherein the NMR logging tool is part of a bottom hole assembly (BHA) of a drill string, and wherein the relative motion data is obtained by modeling transient dynamic behavior of the BHA.

9. The method of claim 8, wherein the modeling comprises calculating interactions between the BHA and rock surfaces within the borehole for given drilling parameters and formation properties.

10. The method of claim 8, wherein motion data from one or more motion measurement sensors is used on conjunction with the modeling of the transient dynamic behavior of the BHA to obtain the relative motion data.

11. The method of claim 1, wherein determining the MID based upon the determined relative motion comprises performing nuclear spin dynamics simulation.

12. The method of claim 11, wherein performing the nuclear spin dynamics simulation comprises, for a plurality of vector maps each corresponding to a respective one of a plurality of time steps, calculating for each voxel of each vector map a spin dynamic as a function of a time-varying magnetic field.

13. The method of claim 12, wherein the time-varying magnetic field comprises a static magnetic field (B0) and/or an oscillating magnetic field (B1).

14. The method of claim 12, wherein the plurality of vector maps comprises a set of vector maps for spin rotations, a set of vector maps for B0, and a set of vector maps for B1, and wherein the spin rotation at each voxel of the spin rotation vector maps are calculated based on corresponding voxels in the B0 and/or B1 vector maps.

15. The method of claim 1, wherein determining the MID based upon the determined relative motion comprises determining net relative displacement of the NMR logging tool.

16. The method of claim 1, wherein the MEK comprises a time constant of the MID that is represented by exponential decay.

17. The system claim 2, wherein the downhole logging tool comprises at least one motion measurement sensor.

18. The system of claim 17, wherein the at least one motion measurement sensor comprises at least one of an accelerometer, a magnetometer, a gyroscope, a caliper, or any combination thereof.

19. The system of claim 17, wherein the at least one motion measurement sensor is located proximate an antenna of the downhole logging tool.

20. The system of claim 19, wherein the downhole logging tool comprises a nuclear magnetic resonance (NMR) logging tool.

21. The system of claim 20, wherein the NMR logging tool comprises a logging while drilling (LWD) NMR logging tool.

22. The system of claim 2, wherein the downhole logging tool comprises a logging-while-drilling (LWD) NMR logging tool.

23. The system of claim 22, wherein the motion-affected measurements comprise spin echoes obtain in response to a pulse sequence applied to a excited region of the earth formation, and wherein the motion-corrected data comprises a motion corrected T1 distribution or a motion-corrected T2 distribution.

24. The system of claim 2, wherein the downhole logging tool is part of a bottom hole assembly (BHA) of a drill string, and wherein the relative motion data is obtained by modeling transient dynamic behavior of the BHA.

25. The system of claim 24, wherein the modeling comprises calculating interactions between the BHA and rock surfaces within the borehole for given drilling parameters and formation properties.

26. The system of claim 2, wherein the relative motion of the downhole logging tool is determined using at least one of a transient dynamic behavior modeling, fluid dynamics model, a particle dynamics model, or a net transport model, or a combination thereof.

27. The system of claim 2, wherein MID is determined based upon the relative motion of the downhole logging tool by using a nuclear spin dynamics simulation.

28. The system of claim 2, wherein the processor is a surface processor.

* * * * *